United States Patent
Fowler

[11] 3,888,016
[45] June 10, 1975

[54] DIGITAL COMPASS

[75] Inventor: John T. Fowler, Winthrop, Mass.

[73] Assignee: Arthur D. Little, Inc., Cambridge, Mass.

[22] Filed: Aug. 10, 1972

[21] Appl. No.: 279,723

[52] U.S. Cl. ............................ 33/346; 33/363 K
[51] Int. Cl. ............................................ G01c 17/26
[58] Field of Search .......... 33/363 K, 363 R, 363 L, 33/363 Q, 364, 346, 355

[56] References Cited
UNITED STATES PATENTS

| | | | |
|---|---|---|---|
| 2,026,919 | 1/1936 | Stright | 33/364 |
| 2,370,000 | 2/1945 | Best | 33/363 K |
| 3,349,406 | 10/1967 | Perry et al. | 33/363 K |
| 3,480,788 | 11/1969 | Barbieri et al. | 33/363 K |
| 3,699,658 | 10/1972 | Burns | 33/364 |

Primary Examiner—Samuel B. Rothberg
Assistant Examiner—John W. Shepperd
Attorney, Agent, or Firm—Weingarten, Maxham & Schurgin

[57] ABSTRACT

A digital magnetic compass in which an optically sensible code element is employed as the compass rotor in conjunction with an array of photosensors to provide a plurality of digital electrical signals representative of compass position. The code element, typically a disk, is mounted for rotation in association with one or more magnets within an enclosure filled with a damping liquid, this enclosure being supported within a liquid filled housing by means of an internal gimbal assembly also disposed in the damping liquid of the housing. The gimbal assembly and compass element are separately disposed in distinct damping mediums such that forces applied to the gimbal assembly are not readily transmitted to the rotatable element.

15 Claims, 3 Drawing Figures

PATENTED JUN 10 1975　3,888,016

SHEET 2

3,888,016

DIGITAL COMPASS

FIELD OF THE INVENTION

This invention relates to magnetic compasses and more particularly to a digital magnetic compass having a gimbal and rotor assembly each damped in a distinct liquid environment.

BACKGROUND OF THE INVENTION

In a digital magnetic compass, the compass rotor takes the form of a code element such as an optically sensible disk encoded in a plurality of concentric tracks each having a number of alternately light responsive and nonresponsive segments thereon. The compass disk is sensed by an associated array of photosensors to provide a plurality of digital electrical signals representative of compass position and which can be employed to energize a digital display or other utilization apparatus, such as a servomechanism or automatic pilot. The compass disk is mounted for rotation on a suitable bearing structure and is supported by a gimbal operative to maintain substantially horizontal disposition of the disk in the presence of external forces caused for example by rolling and pitching motions of a ship or other vessel or body on which the compass is mounted.

An improved digital readout compass is shown in copending application Ser. No. 138,105, filed Apr. 28, 1971 and assigned to the assignee of the instant invention, wherein the compass disk is supported for rotation within a liquid filled enclosure by means of an internal gimbal assembly also disposed within the same liquid medium. Both the compass disk and gimbal assembly are damped by a common liquid medium to minimize spurious disk motion in the presence of external forces transmitted to the compass housing. Under certain operating conditions, such as heavy sea conditions, the liquid damping medium can itself be put into motion, causing spurious rotation of the compass disk. As a result, the compass can become difficult to read and is subject to erroneous readings. Such spurious rotation may continue for a period of time following the discontinuance of the force which initially caused the motion by reason of the inertia of the moving liquid, and thus the compass can be subject to error for relatively long intervals.

SUMMARY OF THE INVENTION

In accordance with the present invention, a digital magnetic compass is provided wherein the compass element and associated magnet are mounted for rotation within a liquid filled enclosure isolated from an outer enclosure which is also liquid filled and which contains an internal gimbal assembly supporting the inner enclosure and compass element. The compass element is typically a disk and is free to rotate within its own damping liquid environment, while the inner enclosure is itself disposed in a separate liquid damping environment by the gimbal assembly. Forces experienced by the gimbal structure are not readily transmitted to the compass disk as these forces tend to be isolated by the distinct liquid mediums.

In a typical embodiment, a digital compass constructed and operative in accordance with the invention includes a disk of light transmissive material having on a surface thereof a plurality of concentric circumferential tracks of alternately light transmissive and opaque equiangular segments, each code track containing a number of segments binarily related to the adjacent track such that each track represents one bit of a multiple bit code. The disk can be coded in any suitable code such as, for example, a binary code or a Gray or other cyclic form of binary code. The code disk is supported for rotation together with an associated magnet within a liquid filled enclosure, and an elongated photosensor array is provided within the enclosure disposed in a radial position with respect to the compass disk and containing a photosensor in light receiving relationship with each of the code tracks of the disk. A light source, such as a light emitting diode, is provided in the enclosure to transmit light through the code tracks of the disk for receipt by the associated photosensor array.

The compass disk and its enclosure are disposed within an outer compass housing, usually of spherical configuration, and are supported for movement therein by a gimbal assembly mounted to a post extending downwardly from the top of the housing. The compass housing is itself filled with a damping liquid such that the gimbal assembly and the disk enclosure supported therefrom are disposed within a common liquid medium, while the compass disk itself remains disposed for rotation within its isolated liquid environment.

In response to light transmitted through the code disk for any angular position thereof with respect to the photosensor array, a plurality of digital output signals are provided by the array representative of the angular position of the disk, and these signals are processed to provide an output indication of compass position. The electronic circuitry for processing the compass signals can be provided on a printed or etched circuit board mounted for example to the disk enclosure. The electronic circuitry is typically embodied in integrated circuit form and thus occupies little space within the compass housing.

DESCRIPTION OF THE DRAWINGS

The invention will be more fully understood from the following detailed description taken in conjunction with the accompanying drawings in which.

DETAILED DESCRIPTION OF THE INVENTION

Figure 1:
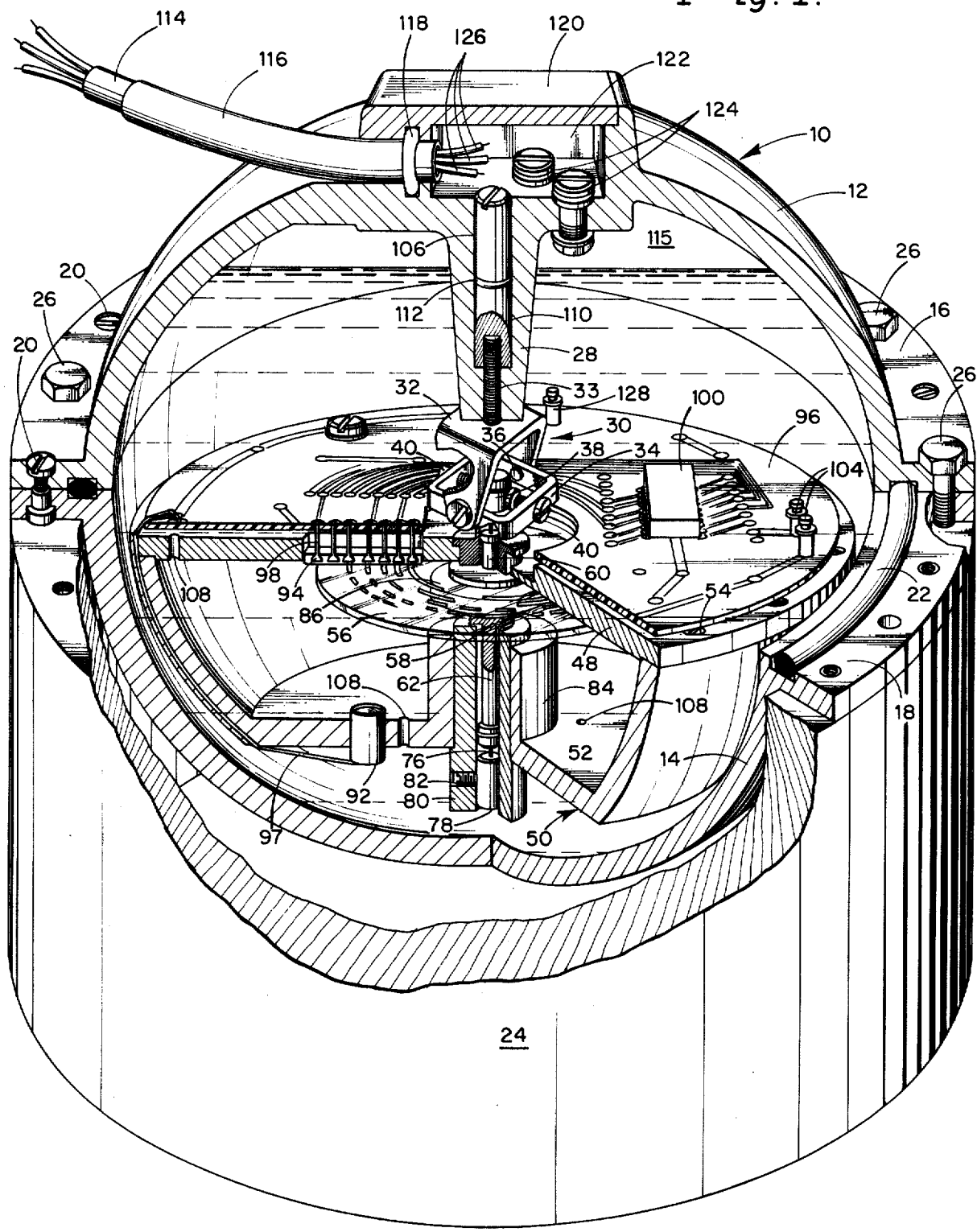
FIG. 1 is a cut-away pictorial view of a digital compass according to the invention.
Figure 2:
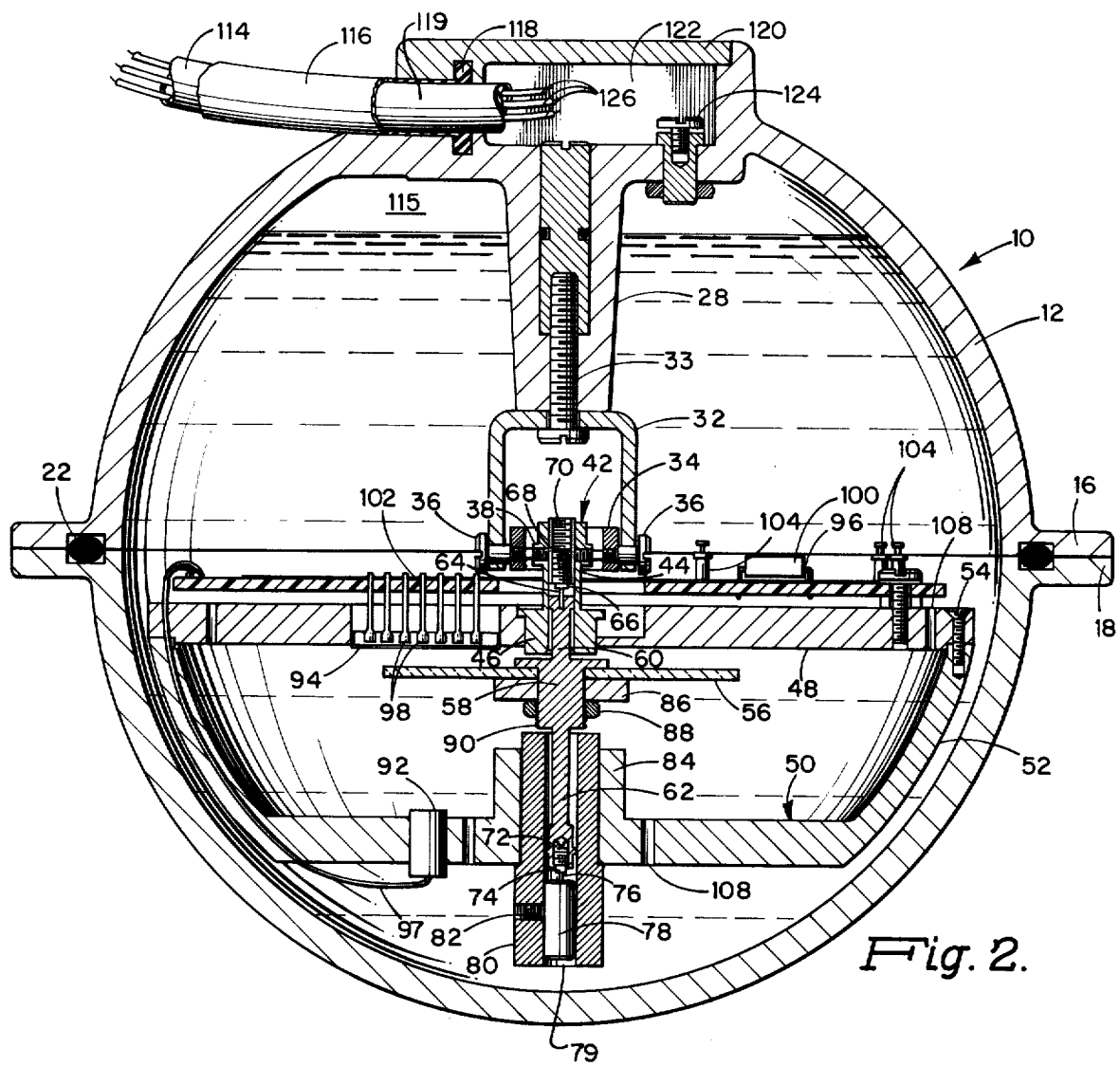
FIG. 2 is a cut-away elevation view of a digital compass according to the invention.

A digital compass constructed and operative according to the invention is shown in FIGS. 1 and 2 and includes a spherical housing 10 typically formed of upper and lower hemispheres 12 and 14, respectively, and with the confronting edges of the hemispheres terminating in respective flanges 16 and 18 which mate to form the overall housing. The hemispheres 12 and 14 of housing 10 are secured together by fasteners 20 provided through openings in flanges 16 and 18. An O-ring 22 or other suitable sealing element can be provided around the periphery of the mating surfaces of the respective hemispheres to provide a sealed enclosure to prevent leakage of damping liquid contained within the compass housing. The lower hemisphere 14 of housing 10 can be disposed within a cylindrical support 24 and secured thereto such as by fasteners 26 to provide a convenient base structure for mounting the compass for use in a marine vessel or other body in which it is to be employed.

A post 28 is provided at the top portion of hemisphere 12 and extends radially inward by an amount less than the full radius of the spherical enclosure. The post 28 can be integrally formed with hemisphere 12, as illustrated, or can be a separate element attached by any suitable mounting means. A gimbal assembly 30 is supported on the lower end of post 28 by a fastening screw 33, the gimbal assembly including a generally U-shaped member 32 fastened as shown to post 28 by screw 33 and supporting a first gimbal 34 by means of mounting pins 36 which define a first axis about which gimbal 34 is rotatable. A second gimbal 38 is disposed within gimbal 34 and supported by pins 40 (FIG. 1) which define a second axis orthogonal to the axis defined by pins 36 and about which gimbal 38 is rotatable.

The inner gimbal 38 includes a generally cylindrical collar portion 42 which extends at right angles to the axis defined by pins 40 and which is employed to support the compass disk enclosure and associated code disk for rotation therein. The collar portion 42 includes a generally cylindrical shaft 44 which terminates at its lower extremity in an enlarged end portion 46 which is affixed to the upper plate 48 of an annular enclosure 50. The enlarged portion 46 can be molded or otherwise secured to enclosure 50 to be integrally affixed for rotation therewith. The enclosure 50 is typically formed by a cup section 52 with the circular top plate 48 secured to the periphery of cup 52 such as by machine screws 54. The enclosure 50 is thereby suspended from the gimbal assembly 30 for maintenance of a generally horizontal disposition in the presence of motion experienced by housing 10.

The code disk 56 in the illustrated embodiment is formed of a light transmissive material such as glass or plastic and is affixed to a hub 58 at the center portion thereof, the hub having oppositely extending shafts 60 and 62. The upper shaft 60 supports a cylindrical pin 64 which includes a conical end cooperating with a bearing 66 which is supported on a set screw 68 mounted within a threaded opening 70 in the upper portion of collar 42. The lower shaft 62 contains a threaded end portion in which a set screw 72 is supported, the lower end of set screw 72 containing a bearing 74 which cooperates with a conical end of a cylindrical pin 76. Pin 76 is affixed to a cylindrical member 78 which is secured within an opening 79 in a cylindrical post 80 and secured therein by a set screw 82. The post 80 is affixed to enclosure 50 by means of a centrally disposed flange portion 84. The compass disk 56 is thus supported for rotation by the respective bearings 66 and 74 which are adjusted to permit free rotation of the disk about the bearing axis. The axial position of the disk is adjustable by means of set screws 68, 72 and member 78.

A cylindrical magnet 86 is provided around hub 58 and is concentrically disposed with respect to disk 56 and secured in engagement with the bottom surface thereof by means of a locking nut 88 cooperative with a threaded portion 90 of hub 58, as illustrated. The magnet has a magnetic axis aligned with the north-south axis of the disk. The cylindrical magnet is preferable in maintaining the mass of the rotatable compass structure near the center of rotation to minimize the torque necessary to cause disk rotation and thereby enhance compass sensitivity. In an alternative embodiment, one or more bar magnets can be provided in association with code disk 56. The code disk 56 is free to rotate about its axis to a position determined by the interaction of magnet 86 with the earth's magnetic field to define a compass position which, as will be described, is electro-optically sensed to provide a plurality of digital electrical signals for processing and display.

The compass structure is fabricated of suitable non-magnetic materials. In a typical implementation the housing 10 is formed of a plastic material such as LEXAN, while the gimbal assembly 32 is fabricated of brass, as is the hub 58 and associated disk supporting structure.

Figure 3:
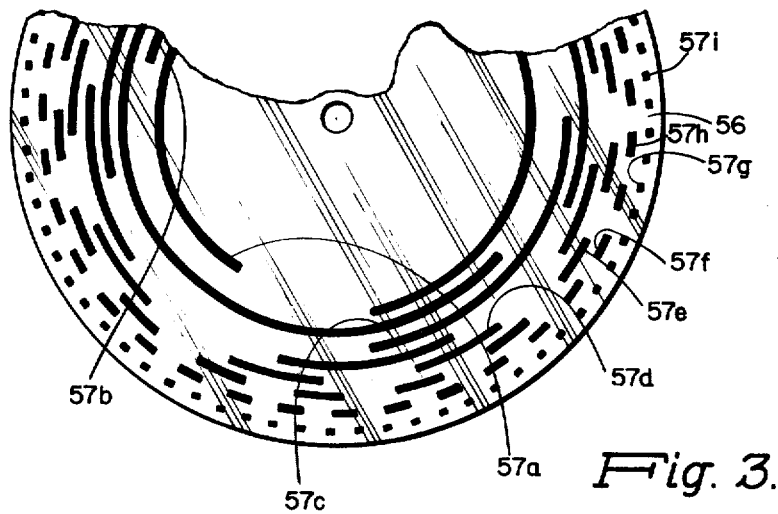
FIG. 3 is a cut-away plan view of a code disk employed in the embodiment of FIGS. 1 and 2.

The coded disk 56 is illustrated more fully in FIG. 3 and is fabricated of a light transmissive material such as glass or plastic and has provided on a surface thereof a plurality of concentric tracks each having a different predetermined number of alternately light transmissive and opaque equiangular segments. Each track is coded to represent one bit of a multiple bit code, the number of tracks being selected to accommodate the intended compass resolution. In the illustrated embodiment, nine concentric tracks, 57a–57i, are provided to produce nine bit codes representing each degree of the 360° of the code disk. The innermost track 57a contains one opaque segment which occupies 180° thereof, the other 180° segment being light transmissive, this track serving as the most significant bit of the multiple bit code. The successive tracks 57b–57i extending outwardly of the disk contain successively increasing pairs of alternately light transmissive and opaque segments which represent successive bit positions of the multiple bit code sensed at each angular position of the disk with respect to the sensor array 94. The code disk per se is well known in the optical angle encoder art and need not be described at length in the present application.

Any suitable form of coding can be employed to provide an output indication of compass position. Preferably, a Gray or other cyclic binary code can be employed having a sequence of code values such that transitions between each Gray code equivalent of adjacent compass degree positions is accomplished with only a single bit change in the detected code. The provision of a code having single bit transitions between each degree position is especially advantageous in minimizing the ambiguous sensing of adjacent codes which can arise if the code disk is positioned with the photosensor array aligned between adjacent degree positions. By use of Gray coding, the possible error or ambiguity is limited to only a single bit or one degree in the embodiment described.

A light emitting diode 92 or other suitable illumination source is provided in the bottom wall of cup 52 in a position to direct light through the coded tracks of disk 56 and connected to a circuit board 96 by wires 97. Light transmitted through disk 56 is received by a photosensor array 94 affixed to plate 48 of enclosure 50 and which includes a linear array of photocells each in light receiving relationship with a respective track of disk 56 and each operative to provide a respective output signal of a first value in response to light received from a transmissive portion of the associated code track and of a second value in response to the absence of light received from an occluded portion of that code track. The array 94 thereby produces a plurality of digital signals which represent the coded equivalent of the compass position as determined by the angular disposition of disk 56 with respect to the compass housing 10.

The photosensor array 94 is connected to a printed circuit board 96 by means of leads 98, this circuit board also including associated electronic circuitry typically in the form of one or more integrated circuit modules 100 which are interconnected to array 94 and to terminal posts 104 by etched conductive paths 102. In a preferred embodiment only three terminal posts need be employed for power, ground and data connections, respectively. Other terminal arrangements can, of course be provided as is well known in the electronics art. Employment of a small number of terminals is, however, advantageous in minimizing the number of interconnecting wires or paths which must be coupled from the compass circuitry to the output cable. The circuit board 96 is mounted on plate 48 of enclosure 50 and is immersed in the damping liquid of housing 10 which provides a stabilized thermal environment for the electronic components.

The cup portion 52 of enclosure 50 typically includes a rounded sidewall which conforms to the curvature of hemisphere 14 and which is spaced therefrom by a predetermined amount. In operation, the housing 10 and enclosure 50 are both filled with a damping liquid, such as water, to provide a separate damping environment for disk 56 and enclosure 50 and for gimbal assembly 30. The housing 10 is filled typically by means of a filling port 106 formed in post 28. Liquid enters enclosure 50 by means of one or more passages or openings 108 provided, for example, through the bottom and top walls of cup portion 52. A plug 110 is threaded onto screw 33 as a closure for port 106 and is sealed for example by an O-ring 112 provided around a circumferential channel in plug 110, as shown.

The enclosure 50 is completely filled with damping liquid while the housing 10 is substantially filled, leaving a small amount of air space 115 to provide room for liquid expansion under varying temperature conditions. The disk 56 is preferably of substantially smaller diameter than that of enclosure 50 by an amount such that swirling of liquid near the periphery of enclosure 50 will not materially affect disk 56. In the illustrated embodiment, the disk 56 has a diameter of two inches while the internal diameter of enclosure 50 at its largest dimension is four inches. The specific dimensions are, of course, a matter of choice dependent upon the particular operating characteristics and specifications desired.

Electrical connection is made to the compass electronics by means of a cable 114 secured for example by means of a sealing sleeve 116 which terminates in a ring 118 disposed within a channel 119 provided in the upper portion of housing 10. A cover 120 encloses a junction box 122 which includes terminal posts 124 each having an upper portion within the junction box for connection to respective wires 126 of cable 114, and a lower portion within hemisphere 12 to which connecting wires (not shown) are coupled from respective terminal posts 104. The interconnecting wires can be braided together and are arranged in a path such as around post 28, to provide slack sufficient to not impede the free rotation of enclosure 50.

Considering the operation of the invention in a typical environment aboard a ship, the compass housing 10 is installed such as by base 24 at any suitable position in the vessel and with the sensor array 94 aligned along or parallel to the longitudinal axis of the vessel. The display of compass heading is usually provided at a position remote from the compass structure itself since the electrical output signals can be transmitted readily to remote locations. Since the compass rotor is not visually viewed, the compass structure can be mounted at various locations which would be unsuitable for conventional visually readable compasses. The compass can, for example, be located in the hold of a ship or even at locations at which rolling, pitching and yawing motions are exaggerated since the compass disk is well damped by its enclosing fluid, while the disk enclosure and supporting gimbal assembly are also damped by the separate liquid medium of housing 10.

The multiple bit signals provided by the photosensor array 94 are processed by the associated logic circuitry to provide output signals representative of compass position, and there output signals are coupled from terminals 104 to terminals 124 and thence to cable 114 for transmission to one or more output indicators, such as a multi-display, or other utilization apparatus such as an auto-pilot. The code representing compass position can be transmitted in either parallel or serial form to the display, although serial transmission is usually preferred to minimize the number of electrical connections required. More than one output display can be provided for energization by the digital compass of the invention. The logic circuitry can take a variety of forms to suit specific operating requirements, typical circuitry for use with the invention being described in the above-identified copending application.

It will be appreciated that various modifications and alternative implementations of the invention can be provided without departing from the spirit and true scope thereof. For example, the compass rotor rather than being a disk, as illustrated hereinabove, can be of other physical configurations such as a cylindrical drum disposed for rotation about its axis and having a sensible code provided in multiple tracks around a circumferential surface thereof. In addition, the invention is not to be limited to the specific type of optically sensible code disk shown in the illustrated embodiment. The code disk can also be, for example, formed of light reflective and opaque segments rather than light transmissive and opaque segments as illustrated. The invention is also applicable to use with other than optically sensible codes. Accordingly, it is not intended to limit the invention by what has been particularly shown and described except as indicated in the appended claims.

What is claimed is:

1. A digital compass comprising:
   a housing containing a damping liquid therein and including:
      first and second circumferentially flanged hemispherical portions secured together in sealing relationship; and
      a support member depending internally from the first hemispherical portion, said member having a sealable liquid port therein through which damping liquid may be introduced to and sealed inside the housing;
   a gimbal assembly supported within the housing by said support member and including:
      a bracket affixed to said support member;
      a first gimbal attached to the bracket for rotation about a first axis;

a second gimbal attached to the first gimbal for rotation about a second axis orthogonal to the first axis;

an enclosure filled with a damping liquid in fluid communication with the housing liquid and pendulously supported by the second gimbal for rotation about said first and second orthogonal axes;

a shaft disposed in said enclosure and rotatably mounted to the second gimbal and the enclosure for rotation about a third axis orthogonal to said first and second axes;

a compass rotor affixed to said shaft within said enclosure and having a sensible code thereon representative of compass headings;

a cylindrical magnet affixed within said enclosure to said shaft and compass rotor and rotatable therewith to align the compass rotor with respect to the earth's magnetic field; and means in said enclosure for sensing the code on the compass rotor and to provide an output signal representative of compass heading.

2. A digital compass according to claim 1 wherein said compass rotor includes:

an optically sensible disk having a plurality of concentric tracks on a surface thereof each with a different number of alternately light transmissive and opaque segments defining a plurality of multiple bit coded values representative of compass headings; and wherein said code sensing means includes:

a light source in said enclosure for transmitting light through the plurality of tracks of said disk;

a plurality of photosensors in said enclosure each operative to receive light from a respective track of said disk and to produce a corresponding digital signal;

a circuit board supported by and rotatable with said enclosure and containing circuitry coupled to the plurality of photosensors and operative to provide in response to the digital signals an output signal representative of compass heading; and means for coupling the output signal to utilization means external of the housing.

3. A digital compass according to claim 2 wherein said enclosure is of generally cylindrical configuration having an inside diameter greater than the diameter of said optically sensible disk by an amount which tends to minimize the effects of motion of said damping liquid on the motion of said disk.

4. A digital compass according to claim 2 wherein said means for coupling the output signal to utilization means includes:

a plurality of electrical terminals each disposed in sealing relationship through the wall of the first hemispherical portion of said housing and adapted for electrical connection by flexible conductors to said circuit board; and a junction box sealingly disposed on the outside of the first hemispherical portion of said housing into which said terminals are disposed and adapted for sealing engagement of an interconnection cable.

5. A digital compass according to claim 1 wherein said second gimbal includes:

a generally cylindrical collar having an axial bore therethrough co-linear with said third orthogonal axis, said collar including:

a generally cylindrical upper portion rotatably attached to said first gimbal; and a bearing element disposed in said axial bore and having a downwardly disposed pivot bearing receptacle;

a generally cylindrical lower portion affixed to the upper wall of said enclosure.

6. A digital compass according to claim 5 wherein said enclosure includes:

a circular upper wall having a central opening therethrough aligned with said third orthogonal axis and affixed to the lower portion of said collar;

a circular lower wall having a central opening therethrough aligned with said third orthogonal axis;

a cylindrical post disposed through the opening in said lower wall and having an axial bore therethrough aligned with said third orthogonal axis; and a bearing member disposed in said axial bore and having a pivot bearing pin extending from the upper surface thereof;

a circumferential wall conforming to the contour of the spherical housing and spaced from the confronting housing surface by a predetermined amount; and a plurality of holes through said enclosure for providing fluid communication paths between the housing liquid and the enclosure liquid.

7. A digital compass according to claim 6 wherein said shaft includes:

a hub around which said compass rotor and magnet are secured for rotation therewith and having a flange against which said rotor is secured; and a fastener for retaining said rotor and magnet against the flange;

a pivot bearing pin supported in the upper end of said shaft and cooperative with the bearing receptacle in said pivot bearing element;

a second pivot bearing element disposed in the lower end of said shaft and having a downwardly disposed pivot bearing receptacle and cooperative with the pivot bearing pin of said bearing member.

8. A digital compass according to claim 1 wherein said second gimbal includes an upper bearing for pivotal support of said compass rotor.

9. A digital compass according to claim 8 wherein said pivot bearing element and bearing member are vertically adjustable in their respective axial bores;

and wherein said second gimbal and cylindrical post each include means for retaining said pivot bearing element and bearing member at a predetermined axial position.

10. A digital compass comprising:

a housing containing a damping liquid therein and having support means depending internally from the upper portion thereof;

a gimbal assembly supported by the support means within the damping liquid in said housing and including:

a bracket affixed to the support means;

a first gimbal attached to the bracket for rotation about a first axis; and a second gimbal attached to the first gimbal for rotation about a second axis orthogonal to the first axis;

an enclosure filled with a damping liquid and pendulously supported by the second gimbal for rotation about said first and second orthogonal axes within the damping fluid of the housing;

a code element having a sensible code provided thereon representative of compass headings and adapted for rotation about a third axis orthogonal to said first and second axes;

means for mounting the code element for rotation within said enclosure and about said third axis said mounting means including a shaft affixed to said code element and rotatably mounted at its upper end to said second gimbal;

one or more magnets provided for rotation with said code element within said enclosure and operative to align said code element with respect to the earth's magnetic field; and means within said enclosure for sensing the code contained on said code element and to provide in response thereto an output signal representative of compass heading.

11. A digital compass according to claim 10 wherein id enclosure includes one or more ports therethrough provide fluid communication between the damping juid of said enclosure and housing.

12. A digital compass comprising:

a housing containing a damping liquid therein and having support means depending internally from the upper portion thereof;

a gimbal assembly supported by the support means within the damping liquid in said housing and including:

a bracket affixed to the support means;

a first gimbal attached to the bracket for rotation about a first axis; and a second gimbal attached to the first gimbal for rotation about a second axis orthogonal to the first axis;

an enclosure filled with a damping liquid and pendulously supported by the second gimbal for rotation about said first and second orthogonal axes within the damping fluid of the housing;

a code element having a sensible code provided thereon representative of compass headings and adapted for rotation about a third axis orthogonal to said first and second axes;

means for mounting the code element for rotation within said enclosure and about said third axis, said mounting means including a shaft affixed to said code element and rotatably mounted at its upper end to said second gimbal and at its lower end to said enclosure for rotation about said third axis;

one or more magnets provided for rotation with said code element within said enclosure and operative to align said code element with respect to the earth's magnetic field; and means within said enclosure for sensing the code contained on said code element and to provide in response thereto an output signal representative of compass heading:

13. A digital compass according to claim 12 wherein said housing is of generally spherical configuration and including:

first and second hemispherical portions each having a mating circumferential flange; and means for securing said circumferential flanges together in liquid sealing relationship;

a junction box exteriorly disposed at an upper portion of one of said hemispherical portions;

a plurality of electrical terminals each disposed in sealing relationship through the wall of the hemispherical portion containing said junction box and each having a first portion within said housing for connection to said code sending means and a second portion exteriorly of said housing in said junction box for connection to utilization means;

a port in said junction box through which damping liquid is supplied to said housing and to said enclosure;

means for sealing said port to prevent leakage of said damping liquid; and means for sealing said junction box to isolate said electrical terminals from the environment.

14. A digital compass according to claim 12 wherein said second gimbal includes an upper portion having bearing means for pivotal support of said compass rotor and a lower portion affixed to said enclosure at a central portion of the top wall thereof for the pendulous support of said enclosure.

15. A digital compass according to claim 14 wherein said code element mounting means includes a shaft having an upper end portion cooperative with said bearing means to define an upper pivot bearing;

a lower end portion cooperative with bearing means on the bottom wall of said enclosure to define a lower pivot bearing;

a hub portion disposed intermediate said upper and lower end portions affixed to said code element and said one or more magnets.

* * * * *